United States Patent
Miyasaka (10) Patent No.: US 8,595,395 B2
(45) Date of Patent: Nov. 26, 2013

(54) RECORDING DEVICE, METHOD OF CONTROLLING RECORDING DEVICE, PROGRAM, AND RECORDING MEDIUM

(75) Inventor: Masayo Miyasaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 32 days.

(21) Appl. No.: 12/946,786

(22) Filed: Nov. 15, 2010

(65) Prior Publication Data

US 2011/0119415 A1   May 19, 2011

(30) Foreign Application Priority Data

Nov. 17, 2009   (JP) .................................. 2009-262005

(51) Int. Cl.
*G06F 5/00*   (2006.01)
*G06F 13/00*   (2006.01)
*G06F 3/00*   (2006.01)

(52) U.S. Cl.
USPC ................................. 710/57; 710/52; 711/170

(58) Field of Classification Search
None
See application file for complete search history.

(56) References Cited

U.S. PATENT DOCUMENTS

| | | | | |
|---|---|---|---|---|
| 5,448,702 | A * | 9/1995 | Garcia et al. | 710/100 |
| 5,754,764 | A * | 5/1998 | Davis et al. | 709/200 |
| 7,605,935 | B2 | 10/2009 | Nakamaki et al. | |
| 2004/0199732 | A1 * | 10/2004 | Kelley et al. | 711/158 |
| 2005/0200895 | A1 * | 9/2005 | Isoda et al. | 358/1.16 |
| 2006/0268329 | A1 * | 11/2006 | Lo | 358/1.15 |
| 2007/0033377 | A1 * | 2/2007 | Sinclair et al. | 711/203 |
| 2007/0162658 | A1 * | 7/2007 | Furukawa et al. | 710/52 |
| 2008/0010389 | A1 | 1/2008 | Iwata | |
| 2009/0027714 | A1 * | 1/2009 | Kuhn et al. | 358/1.15 |

FOREIGN PATENT DOCUMENTS

| | | |
|---|---|---|
| JP | 2001-260435 A | 9/2001 |
| JP | 2002-108579 A | 4/2002 |
| JP | 2002-120094 A | 4/2002 |
| JP | 2008-015823 A | 1/2008 |

* cited by examiner

*Primary Examiner* — Henry Tsai
*Assistant Examiner* — Michael Sun (57) ABSTRACT

A recording device is connectable to a host computer and performs recording on the basis of received data including commands, received from the host computer. A receiving buffer stores therein the received data received from the host computer. A command detection section reads the received data stored in the receiving buffer while scanning the receiving buffer with a first read pointer to detect the commands included in the received data. A command execution section processes the commands detected by the command detection section in a stored order of the commands in the receiving buffer. An immediate processing command detection section reads the received data stored in the receiving buffer while scanning the receiving buffer with a second read pointer which is provided separately from the first read pointer to detect an immediate processing command included in the received data. The command execution section preferentially processes the immediate processing command detected by the immediate processing command detection section regardless of the stored order of the commands in the receiving buffer.

17 Claims, 8 Drawing Sheets

RECORDING DEVICE, METHOD OF CONTROLLING RECORDING DEVICE, PROGRAM, AND RECORDING MEDIUM

The disclosure of Japanese Patent Application No. 2009-262005 filed on Nov. 17, 2009, including specification, drawings and claims are incorporated herein by reference in its entirety.

BACKGROUND

The present invention relates to a recording device which performs recording in accordance with commands transmitted from a host computer, a method of controlling a recording device, a program, and a recording medium.

In the related art, a recording apparatus operates in accordance with commands transmitted from a host computer serving as a higher-level apparatus (for example, see Patent Document 1). The commands that the recording apparatus receives from the host computer include a normal command and an immediate processing command (real-time control command), such as a command of a status return instruction or a reset instruction of the recording apparatus, which has to be processed promptly. For example, when having received data from the host computer, the apparatus described in Patent Document 1 detects a command and an immediate processing command in received data, and a normal command or data related to the normal command is stored in the queue of the receiving buffer and executed in the received order. The immediate processing command is not stored in the receiving buffer and is promptly executed regardless of the received order.

Patent Document 1: JP-A-2001-260435

In the above-described method, for all pieces of received data received from the host computer, it is detected whether or not a command is included in received data each time data is received. When a command is included in received data, it is further determined whether or not the detected command is an immediate processing command. For this reason, for example, when a large quantity of data is collectively transmitted, the above-described command detection processing is performed for all pieces of received data before being stored in the receiving buffer. This command detection processing may become a bottleneck, causing degradation of throughput.

In a general recording apparatus, when it is inappropriate to continue a recording operation, such as when there is no recording medium, such as a sheet, when the cover of the recording apparatus is open, when an error occurs, or the like, the recording operation stops and the interface to the host computer is in the offline state (logical disconnection state), such that maintenance of the recording apparatus and data received from and the host computer, and safety of the user are ensured. The recording apparatus does not perform detection of a command from received data or processing of received data in the offline state. In this case, even when an immediate processing command is included in received data, since the immediate processing command is not detected, there is concern that it is slow in coping with the immediate processing command.

SUMMARY

It is therefore an object of at least one embodiment of the present invention to provide a recording device capable of performing recording in accordance with commands transmitted from a host computer, rapidly detecting commands transmitted from the host computer, and rapidly detecting and executing an immediate processing command, a method of controlling a recording device, a program, and a recording medium.

In order to achieve at least one of the above-described objects, according to a first aspect of the embodiments of the present invention, there is provided a recording device which is connectable to a host computer and performs recording on the basis of received data including commands, received from the host computer, the recording device comprising: a receiving buffer that stores therein the received data received from the host computer; a command detection section that reads the received data stored in the receiving buffer while scanning the receiving buffer with a first read pointer to detect the commands included in the received data; a command execution section that processes the commands detected by the command detection section in a stored order of the commands in the receiving buffer; and an immediate processing command detection section that reads the received data stored in the receiving buffer while scanning the receiving buffer with a second read pointer which is provided separately from the first read pointer to detect an immediate processing command included in the received data, wherein the command execution section preferentially processes the immediate processing command detected by the immediate processing command detection section regardless of the stored order of the commands in the receiving buffer.

With this configuration, received data including commands or print data, received from the host computer is stored in the receiving buffer, and the receiving buffer is scanned with the first read pointer for a command and the second read pointer for an immediate processing command individually to respectively detect a normal command and an immediate processing command. Since the commands are detected after received data from the host computer is stored in the receiving buffer temporarily, even when a large quantity of data is received from the host computer in a short time, all pieces of data are rapidly received and stored without detecting the commands, and analysis is then performed without leakage to detect the commands. The immediate processing command is detected by scanning the receiving buffer with a read pointer which is different from a read pointer for the normal command. Thus, it is possible to rapidly detect only the immediate processing command with no effect of the execution state of the normal command. Therefore, even when there is a large quantity of received data, it is possible to rapidly process the immediate processing command.

In this case, commands other than the immediate processing command may be detected by the first read pointer. When the immediate processing command which has been detected by the second read pointer is again detected by the first read pointer, the immediate processing command not processed redundantly. The immediate processing command detected by the second read pointer can be executed at a predetermined timing. Depending on the type of the immediate processing commands, the immediate processing command which has been detected and processed by the second read pointer may be detected and processed by the first read pointer again. For example, the status return instruction of the recording device can be processed redundantly. Thus, the status return instruction may be detected and processed by both of the first read pointer and the second read pointer.

Even in an offline state where the execution of a normal command stops, the immediate processing command may be detected and processed. In this case, even in the offline state, it is advantageous in that the immediate processing command can be rapidly processed.

The command execution section may execute a command detected by the command detection section in the normal operation state and may process the immediate processing command detected by the immediate processing command detection section in both of the normal operation state and the offline state.

The recording device may further comprise an immediate processing command buffer that stores therein received data received from the host computer after the receiving buffer become substantially full with the received data, and the immediate processing command detection section may scan the immediate processing command buffer with the second read pointer to detect the immediate processing command included in the received data.

In this case, even when there is a large quantity of received data from the host computer and the receiving buffer is full or nearly full, the immediate processing command can be detected and processed. Thus, even when there is a large quantity of received data, it is possible to rapidly respond to the immediate processing command. In the buffer full state, usually, the recording device goes the offline state where commands are not detected or executed. Meanwhile, with the configuration of the invention, the immediate processing command can be detected and executed separately from the normal command, and the immediate processing command can be processed rapidly even when the recording device is in the offline state. Even when the recording device notifies the offline state, the host computer may transmit the immediate processing command to cause the recording device to process the immediate processing command. Even in such a case, the recording device can receive the immediate processing command, and can detect and process the immediate processing command. When the recording device has been switched from the online state to the offline state, the immediate processing command which the host computer transmits since the host computer is unable to immediately stop the transmission can be processed. It is preferable to provide a sub-receiving buffer such as an immediate processing command buffer, in the recording device, so that the recording device can receive the immediate processing command even after the offline notification.

The receiving buffer may be scanned such that the second read pointer is ahead of the first read pointer.

In this case, the receiving buffer is scanned such that the read pointer for detecting the immediate processing command is ahead of the read pointer for detecting the normal command. For this reason, it is possible to rapidly detect the immediate processing command with no effect of the detection and execution states of the normal command. The first read pointer does not leave the second read pointer behind.

The recording device may further include a counter which counts by adding a write position of a write pointer for writing received data into the receiving buffer and subtracting a read position of the first read pointer. The counter may indicate the quantity of received data of the receiving buffer. It is possible to determine whether the buffer full state is reached or not by comparing this quantity of the received data with the capacity of the receiving buffer.

Even when the immediate processing command which has been detected by the second read pointer is again detected by the first read pointer, the command execution section may not process the immediate processing command redundantly. The immediate processing command is not processed redundantly.

The recording device may further comprise: a receiving control section that stores the received data received from the host computer in the receiving buffer before the command detection section and the immediate processing command detection section respectively detect the commands included in the received data.

In this case, the received data is stored in the receiving buffer before the processing for detecting the normal command and the immediate processing command, and commands are detected for the received data stored in the receiving buffer. Accordingly, even when a large quantity of data is received from the host computer in a short time, processing, such as command detection, is not performed, and all pieces of data are rapidly received and stored. After data has been stored, analysis can be performed without leakage to detect commands.

In the recording device, the receiving control section may include a transfer section which directly transfers received data received from an interface of the host computer to the receiving buffer.

In this case, for example, the received data from a USB interface of the host computer is directly transferred to the receiving buffer through DMA (Direct Memory Access) or the like and stored in the receiving buffer. Thus, data can be transmitted and received between the recording device and the host computer at a high speed, and the received data can be reliably stored in the receiving buffer without leakage and analyzed. Therefore, communication with the host computer is performed at a high speed, improving throughput.

According to a second aspect of the embodiments of the present invention, there is provided a method of controlling a recording device which is connectable to a host computer and performs recording on the basis of received data including commands, received from the host computer, the method comprising: storing the received data received from the host computer a receiving buffer; reading the received data stored in the receiving buffer while scanning the receiving buffer with a first read pointer to detect the commands included in the received data; processing the detected commands in a stored order of the commands in the receiving buffer; reading the received data stored in the receiving buffer while scanning the receiving buffer with a second read pointer which is provided separately from the first read pointer to detect an immediate processing command included in the received data; and preferentially processing the detected immediate processing command regardless of the stored order in the receiving buffer.

With this method, the received data received from the host computer is stored in the receiving buffer temporarily, and the receiving buffer is scanned with the first read pointer for the normal commands and the second read pointer for the immediate processing commands individually to respectively detect the normal commands and the immediate processing commands. Since the command detection is performed after the received data from the host computer is stored in the receiving buffer without performing the command detection, even when a large quantity of data is received from the host computer in a short time, all pieces of data can be rapidly received and stored without performing the command detection and then the commands are detected by analyzing the received data stored in the receive buffer without leakage. Therefore, the immediate processing command can be rapidly detected with no effect of the execution state of the normal command. Even when there is a large quantity of the received data, it is possible to rapidly process the immediate processing command.

According to a third aspect of the embodiments of the present invention, there is provided a program that causes a controller of a recording device which is connectable to a host computer and performs recording on the basis of received data including commands, received from the host computer, to execute the above described method.

By executing the above described program with the control section, the received data received from the host computer is stored in the receiving buffer temporarily, and the receiving buffer is scanned with the first read pointer for the normal commands and the second read pointer for the immediate processing commands individually to respectively detect the normal commands and the immediate processing commands. Since the command detection is performed after the received data from the host computer is stored in the receiving buffer without performing the command detection, even when a large quantity of data is received from the host computer in a short time, all pieces of data can be rapidly received and stored without performing the command detection and then the commands are detected by analyzing the received data stored in the receive buffer without leakage. Therefore, the immediate processing command can be rapidly detected with no effect of the execution state of the normal command. Even when there is a large quantity of the received data, it is possible to rapidly process the immediate processing command.

According to a fourth aspect of the embodiments of the present invention, there is provided a computer-readable recording medium that records therein the above described program.

According to the aspects of the invention, even when a large quantity of data is received from the host computer in a short time, all pieces of data can be rapidly received and stored without performed processing, such as command detection. Then, analysis can be performed without leakage to detect commands, and the immediate processing command can be rapidly detected and processed.

DETAILED DESCRIPTION OF THE EMBODIMENTS

Hereinafter, an embodiment of the invention will be described with reference to the drawings.

Figure 1:
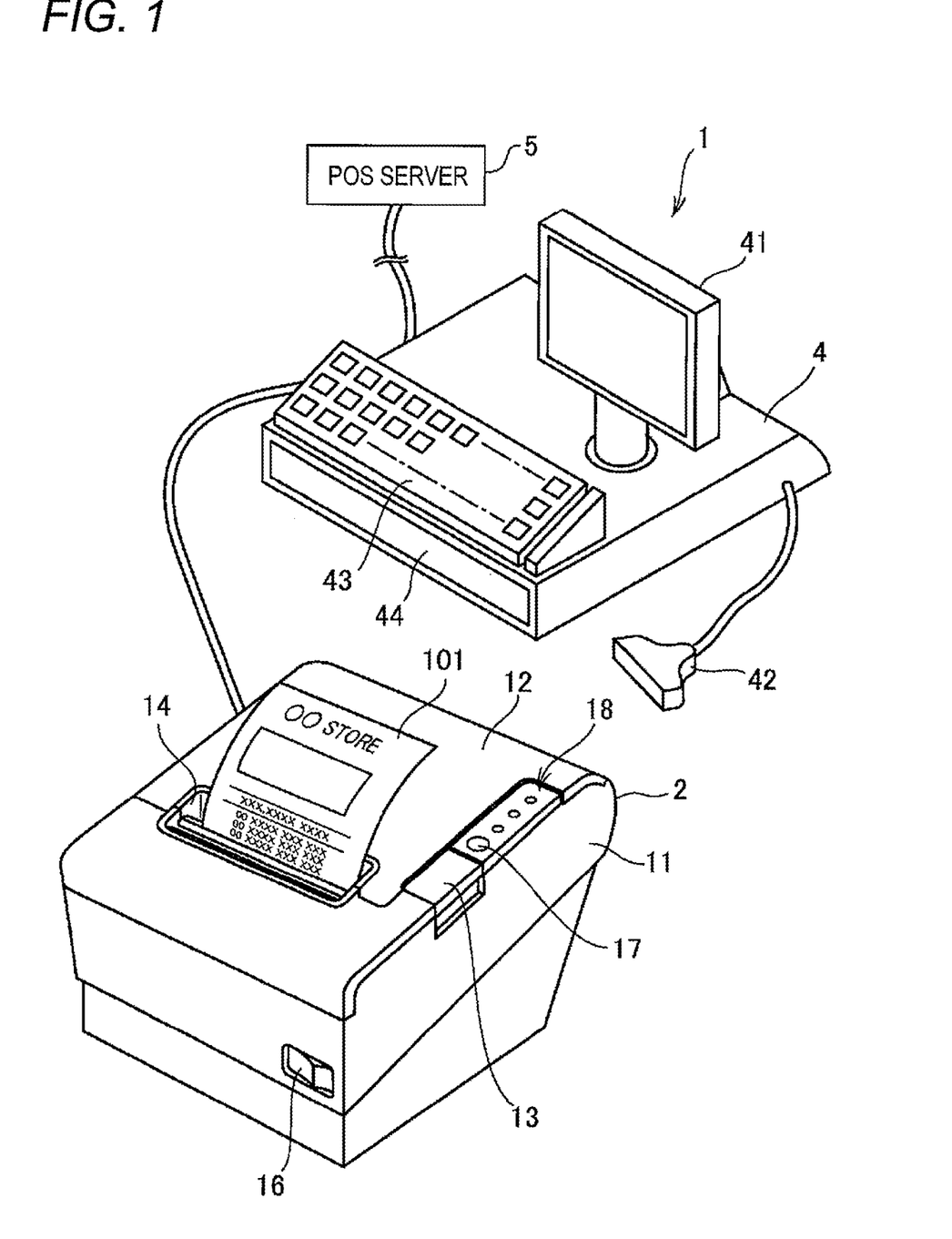
FIG. 1 is a diagram illustrating the schematic configuration of a POS terminal according to an embodiment.

FIG. 1 is a diagram illustrating the schematic configuration of a POS terminal 1 according to an embodiment to which the invention is applied.

The POS terminal 1 is a register which is installed in the front of a small retail store or the like to calculate sales, and constitutes a POS (Point of Sale) system. The POS terminal 1 is configured such that a printer 2 which issues a receipt 101 is connected to a host computer 4 which performs sales registration processing and calculation processing. The host computer 4 corresponds to an apparatus which is externally connected to the printer 2. The host computer 4 is connected to a POS server 5, which collects sales registration information, through a communication line. The host computer 4 includes a display 41 which displays the processing contents of the sales registration processing and the calculation processing, a barcode scanner 42 which reads a barcode attached to a product at the time of the sales registration processing, a key input section 43 which includes various keys, such as a sales registration key, a cash drawer 44 which accommodates cashes for calculation, and the like. As described below, the cash drawer 44 is connected to the printer 2 and opened when receiving a drawer open signal input from the printer 2.

The printer 2 serving as a recording apparatus (recording device) accommodates a thermal roll sheet serving as a recording medium in a main body 11, prints (records) an image on the roll sheet by a printing head, and outputs the roll sheet with an image printed thereon as the receipt 101. The printer 2 includes a roller-shaped platen (not shown) which transports the roll sheet, and a printing head which is arranged to be opposite the platen. A cutter unit (not shown) is arranged in the vicinity of a sheet discharge port 14 to cut the roll sheet. The printing head which is provided in the printer 2 of this embodiment is, for example, a line thermal head in which heat generation bodies (not shown) are arranged in a row or in multiple rows in the width direction of the roll sheet. Electrical conduction is provided by a print engine 20 described below for each heat generation element, and the heat generation element is in close contact with the printing surface (recording surface) of the roll sheet to provide thermal energy to the roll sheet, causing color production of the roll sheet.

The roll sheet printed by the printing head is transported outwardly from the sheet discharge port 14 formed at the top surface of the main body 11, cut by the cutter unit, and output as the receipt 101. Characters, such as the store name or sold product name, the number of products, the amount, and the total amount, an image, such as a logo, and the like are printed on the receipt 101.

As shown in FIG. 1, an openable cover 12 is provided in the main body 11 of the printer 2. The main body 11 is provided with a lever 13 for opening the cover 12. If the cover 12 is opened, a space where the roll sheet is accommodated is exposed and roll sheet replenishment or replacement is possible. The main body 11 is also provided with a power switch 16 which turns on/off the printer 2, a sheet feed switch 17 which is manipulated to instruct a sheet feed operation of the roll sheet or to instruct switching of an operation mode or the like under a predetermined condition at the time of control, and an LED display section 18 which displays the operation state of the printer 2 or the like.

The printer 2 drives a transport motor which rotates a platen roller to transport the roll sheet, a cutter driving motor which drives the cutter unit to cut the roll sheet, and the printing head to record characters or images on the roll sheet.

Figure 2:
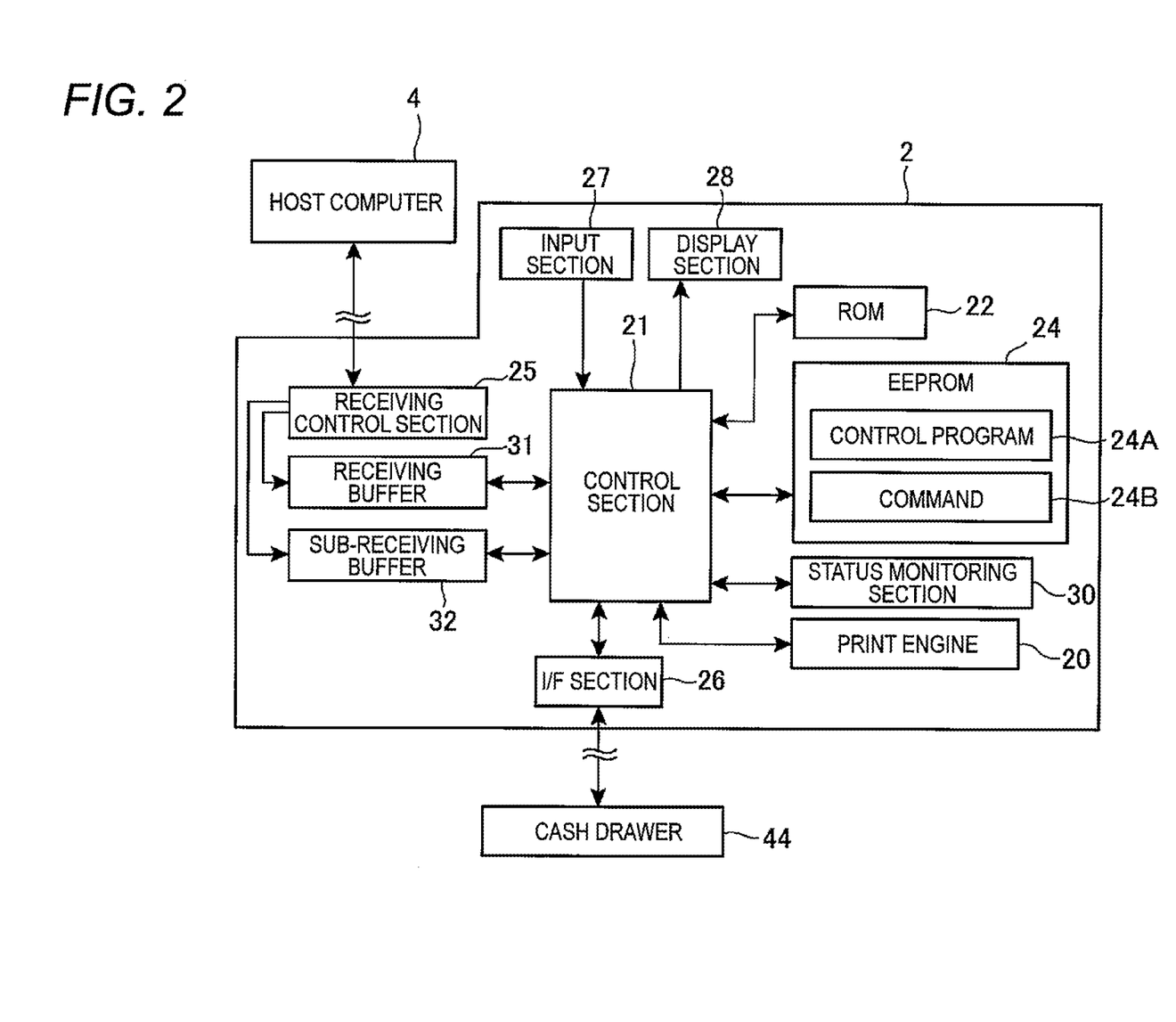
FIG. 2 is a block diagram illustrating the configuration of a printer.

FIG. 2 is a block diagram illustrating the circuit configuration of the printer 2.

The printer 2 includes a print engine 20 which performs actual printing, a control section 21 which overall controls the printer 2, a ROM 22 which stores a basic control program, which is executed by the control section 21, an EEPROM 24 which stores a control program 24A and a command 24B, which are executed by the control section 21, a receiving control section 25 which performs receiving control of a command transmitted from the host computer 4, an interface section 26 which is connected to the cash drawer 44, an input section 27 which detects the manipulation of the sheet feed switch 17 (FIG. 1), a display section 28 which controls the LED display section 18 to perform various kinds of display, a status monitoring section 30 which monitors the operation state of each section of the printer 2, and a receiving buffer 31 and a sub-receiving buffer 32 (immediate processing command buffer) which temporarily store received data received by the receiving control section 25 and are constituted by a RAM or the like. The control section 21 includes a CPU and the like.

The receiving control section 25 has various interfaces, such as a USB or an RS232C interface, and is connected to the above-described interface provided in the host computer 4 in a wired or wireless manner.

The print engine 20 creates characters or images to be printed on the roll sheet serving as a recording medium on the basis of printing data transmitted from the host computer 4 under the control of the control section 21, operates the printing head, the cutter driving motor, and the transport motor provided in the printer 2 while monitoring the detection values of various sensors, such as a sheet end sensor and a residual sheet quantity sensor, and performs printing on the roll sheet.

As described above, the printer 2 includes the printing head which attaches ink or toner to the printing surface of a sheet or a recording medium made of synthetic resin (roll sheet, cut sheet, copy sheet), or applies heat to the printing surface of the recording medium, a printing head driving mechanism which moves the printing head with respect to the recording medium, a transport mechanism which transports the recording medium, and the like. The printing head and various mechanisms are controlled by the print engine 20.

The print engine 20 operates the transport motor to transport the roll sheet by a predetermined amount under the control of the control section 21 when the manipulation of the sheet feed switch 17 is detected by the input section 27, and changes the lighting state of each LED of the LED display section 18 through the display section 28 in accordance with the operation state of the printer 2 or the like.

The control section 21 includes therein a CPU and a memory, serving as a work area, which temporarily stores programs to be executed or data. The control section 21 functions as a microcomputer and executes the basic control program stored in the ROM 22, or the control program 24A stored in the EEPROM 24.

The ROM 22 stores the basic control program which initializes each section of the printer 2 and controls each section by the control section 21, data related to the basis control program, and the like in a nonvolatile manner.

The EEPROM 24 is a rewritable nonvolatile storage device. The EEPROM 24 stores various programs including the control program 24A and the command 24B, and data.

The receiving control section 25 executes a predetermined communication protocol with respect to the host computer 4. The receiving control section 25 receives signals transmitted from the host computer 4, demodulates (decodes) the received signals to create received data, and sequentially stores received data in the receiving buffer 31 and the sub-receiving buffer 32. The receiving control section 25 includes, for example, a connector to which a communication cable is connected and a communication circuit or a wireless communication circuit and an antenna.

The receiving buffer 31 is a temporary storage device which sequentially stores received data output front the receiving control section 25. The receiving buffer 31 stores the commands which are received by the receiving control section 25 from the host computer 4 and data, such as printing data, which are subsequent to the commands, for example, by 64 bits without differentiating between the commands and data. That is, the receiving control section 25 stores received data received from the host computer 4 in the receiving buffer 31 without performing analysis or the like on whether or not received data includes a command.

To the status monitoring section 30 provided in the printer 2 are connected respective detection sections which detect a power supply voltage supplied from the outside to the printer 2, the open/closed state of the cover 12, presence/absence of the roll sheet, and the like. The status monitoring section 30 outputs detection signals indicating occurrence of events in the printer 2, for example, abnormality of the power supply voltage in the printer 2, the open state of the cover (not shown) of the printer 2 which is opened/closed at the time of sheet replenishment or replacement of an ink cartridge, paper-out of the printer 2, the manipulation of the sheet feed switch 17, and the like, to the control section 21 as interrupt signals on the basis of the detection states of the detection sections.

Examples of the operation state of the printer 2 include the online state where communication with the host computer 4 and printing can be performed and the offline state where only a minimum operation is performed. The offline state refers to the state where, when it is inappropriate to continue the printing operation, the printing mechanism including the printing head is stopped, the host computer and the interface are logically disconnected from each other, such that maintenance of the printing apparatus and communication data, and safety of the user can be ensured. The control section 21 is in the online state during the normal operation. If an offline factor occurs, for example, when the receiving buffer 31 is full, when the cover is open, or when there is no sheet, the control section 21 is changed to the offline state. In the offline state, when the status monitoring section 30 detects that an offline factor is eliminated, the control section 21 is changed to the online state.

When being changed to the offline, the control section 21 notifies the offline state to the host computer 4, and the host computer 4 stops transmission of data until the online state is notified again. At this time, even when the offline state is notified, the host computer 4 intends to transmit a real-time control command in emergency such that the real-time control command is processed. To this end, the printer 2 is provided with the sub-receiving buffer 32, such that, even when the offline state is notified, the real-time control command can be preferentially received.

Figure 3:
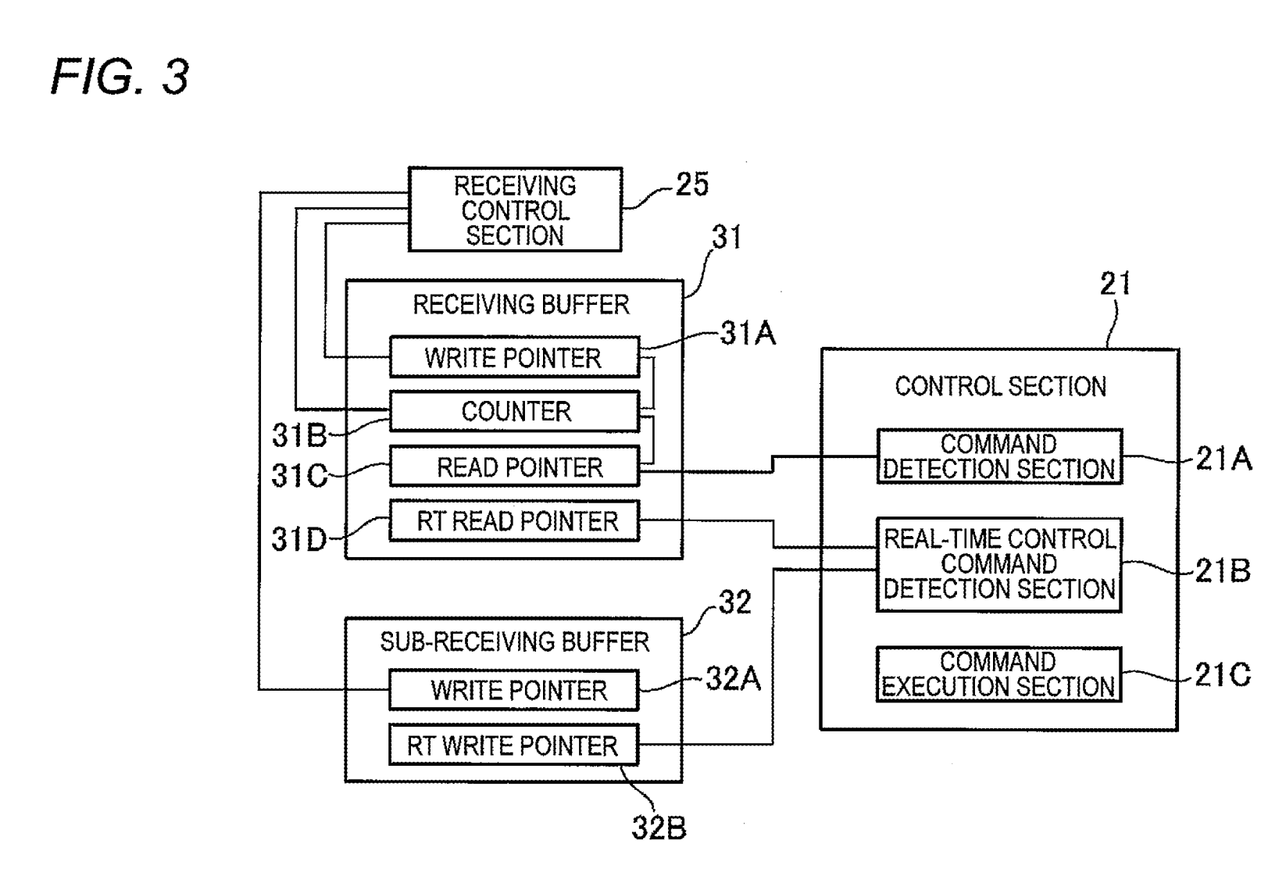
FIG. 3 is a functional block diagram of a control section in the printer.

FIG. 3 is a block diagram illustrating the functional configuration of the control section 21 in the printer 2.

As shown in FIG. 3, the control section 21 functions as a command detection section 21A, a real-time control command detection section (immediate processing command detection section) 21B, and a command execution section 21C. The control section 21 executes the control program 24A stored in the EEPROM 24 to implement these functions.

As described above, the receiving control section 25 stores received data received from the host computer 4 in the receiving buffer 31. The receiving buffer 31 is provided with a write pointer 31A which is controlled by the receiving control section 25. The receiving control section 25 writes received data while moving the write pointer 31A.

The command detection section 21A controls a read pointer 31C (first read pointer) which is provided in the receiving buffer 31. The command detection section 21A reads received data while scanning the receiving buffer 31 with the read pointer 31C, and detects commands included in received data. The counter 31B counts by adding the write position of the write pointer 31A for writing received data into the receiving buffer 31 and subtracting the read position of the read pointer 31C for read received data from the receiving buffer 31. The counter 31B represents the quantity of received data of the receiving buffer 31. The receiving control section 25 can compare the value of the counter 31B with the capacity of the receiving buffer 31 to determine the buffer full state and notify the buffer full state to the host computer 4.

Figure 4A:
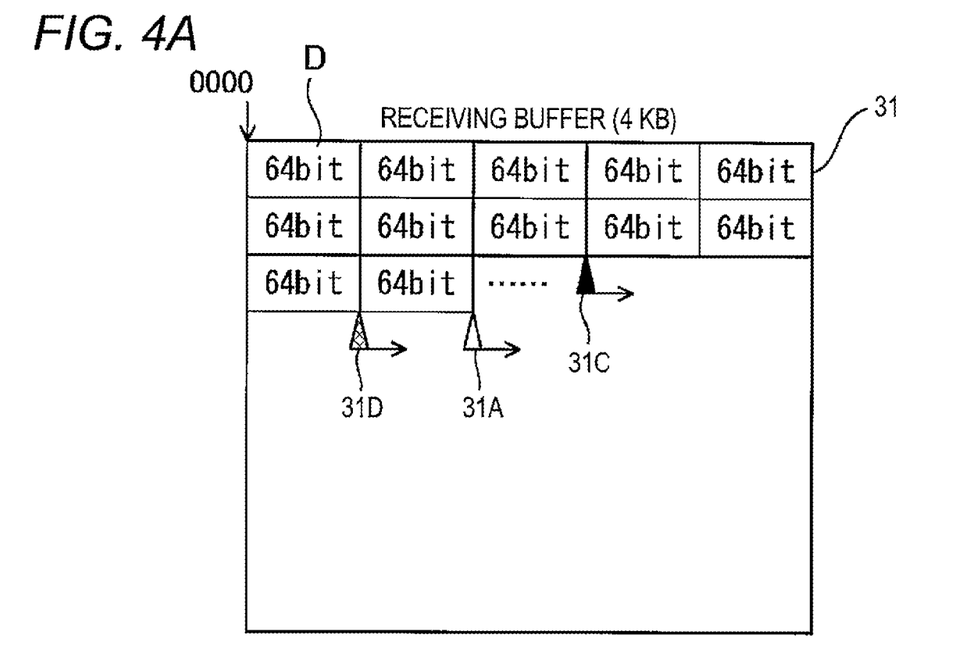
FIG. 4A is diagram schematically illustrating the configuration of a receiving buffer.
Figure 4B:
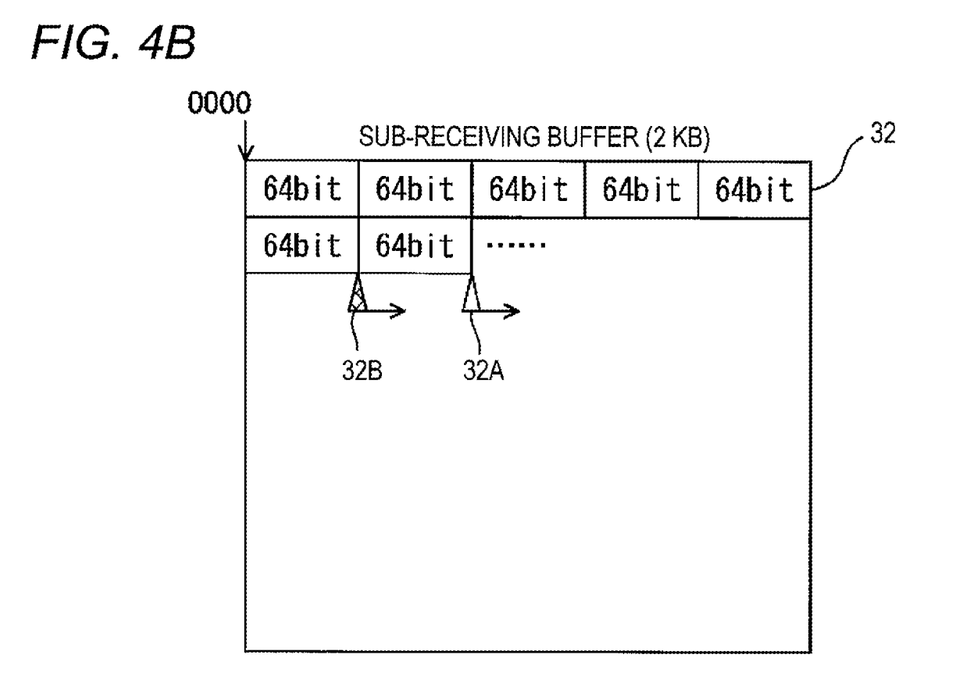
FIG. 4B is diagram schematically illustrating the configuration of a sub-receiving buffer.

FIG. 4A schematically illustrates an example of the configuration of the receiving buffer 31. FIG. 4B schematically shows an example of the configuration of the sub-receiving buffer 32.

As shown in FIG. 4A, the receiving buffer 31 has, for example, the capacity of 4 KB (kilobytes). When received data D from the host computer 4 is written in units of 64 bits, the write pointer 31A moves by 64 bits from the head address (0000), such that writing by the receiving control section 25 is performed. Following the write pointer 31A, the receiving buffer 31 is scanned with the read pointer 31C sequentially from the head address (0000), and received data D which has already been written is read by the command detection section 21A (FIG. 3), and command detection is performed.

In the normal operation state, that is, in the online state described below, the commands detected by the command detection section 21A are executed in an order of being detected by the command execution section 21C. The command detection section 21A delivers the detected commands to the command execution section 21C to be executed, and erases read received data from the receiving buffer 31. The command detection section 21A may perform overwriting next time without erasing the commands. The command execution section 21C executes the commands detected by the command detection section 21A in the stored order in the receiving buffer 31, that is, in the detected order in which the command detection section 21A detects the commands. The commands are, for example, commands, such as printing execution and roll sheet transport.

The receiving buffer 31 is provided with a real-time control command read pointer 31D (second read pointer). The real-time control command read pointer 31D is a read pointer which is used when the real-time control command detection section 21B detects a real-time control command, and with this real-time control command read pointer 31D, the receiving buffer 31 is scanned sequentially from the head address (0000). The real-time control command detection section 21B reads received data D (FIG. 4A) while scanning the receiving buffer 31 with the real-time control command read pointer 31D provided in the receiving buffer 31, and detects a real-time control command included in received data D.

The real-time control commands detected by the real-time control command detection section 21B are promptly executed by the command execution section 21C in the detected order, in which the real-time control command detection section 21B detects the real-time control commands, regardless of the offline state and the online state. Examples of the real-time control commands (immediate processing command) include a status request command which instructs transmission of a status notification, a buffer clear command which instructs full erasure of the receiving buffer 31 and the sub-receiving buffer 32, a drawer open command which instructs the opening operation of the cash drawer 44, and the like.

As shown in FIG. 4A, the receiving buffer 31 is scanned such that the real-time control command read pointer 31D is ahead of the read pointer 31C. This is because a real-time control command may be included in processing-target data of a normal command. That is, when received data D including a real-time control command is accompanied by a normal command, received data D is executed by the command execution section 21C when the normal command is detected by the command detection section 21A and then erased. At this time, in order to prevent the real-time control command from being erased while not being executed, the real-time control command read pointer 31D is ahead of the read pointer 31C. Thus, even when a real-time control command is included in processing-target data of a normal command, the real-time control command is detected and executed ahead of the normal command. Therefore, it is advantageous in that it is possible to respond to the real-time control command without leakage. The read pointer 31C does not leave the real-time control command read pointer 31D behind.

As shown in FIG. 3, the receiving buffer 31 and the sub-receiving buffer 32 are connected to the receiving control section 25. The sub-receiving buffer 32 is an area where received data is stored after the receiving buffer 31 is full. The sub-receiving buffer 32 is provided with a write pointer 32A which is controlled by the receiving control section 25, and a real-time control command read pointer 32B which is controlled by the real-time control command detection section 21B. The receiving control section 25 moves the write pointer 32A by 64 bits from the head address (0000) to perform writing. The sub-receiving buffer 32 is not provided with a read pointer which is used when the command detection section 21A detects a normal command.

When the receiving buffer 31 is full and the buffer full state is notified to the host computer 4, data transmission from the host computer 4 is stopped. However, when there is data which has already been transmitted from the host computer 4 when the buffer full state (the offline state) is notified, or when the host computer 4 intends to transmit and process a real-time control command in emergency, the data is received by the receiving control section 25 even after the buffer full state is reached. Since this received data is unable to be stored in the receiving buffer 31, the printer 2 has the sub-receiving buffer 32 which serves as an area for storing such received data. Even when a normal command is included in received data stored in the sub-receiving buffer 32, the control section 21 does not have this command as an execution target. This is because it will suffice that received data in the sub-receiving buffer 32 is data which is received after the buffer full state is reached, and is received again after the buffer full state is released. Meanwhile, when a real-time control command is included in received data of the sub-receiving buffer 32, it is necessary that the real-time control command is promptly executed. For this reason, the sub-receiving buffer 32 is provided with only the real-time control command read pointer 32B as a read pointer, and is not provided with the read pointer for detecting the normal commands. The real-time command detection section 31B scans the sub-receiving buffer 32 with the real-time control command read pointer 32B to detect the real-time control command. Similarly to the real-time control command detected in the receiving buffer 31, the real-time control command detected in the sub-receiving buffer 32 is promptly executed by the command execution section 21C.

Figure 5:
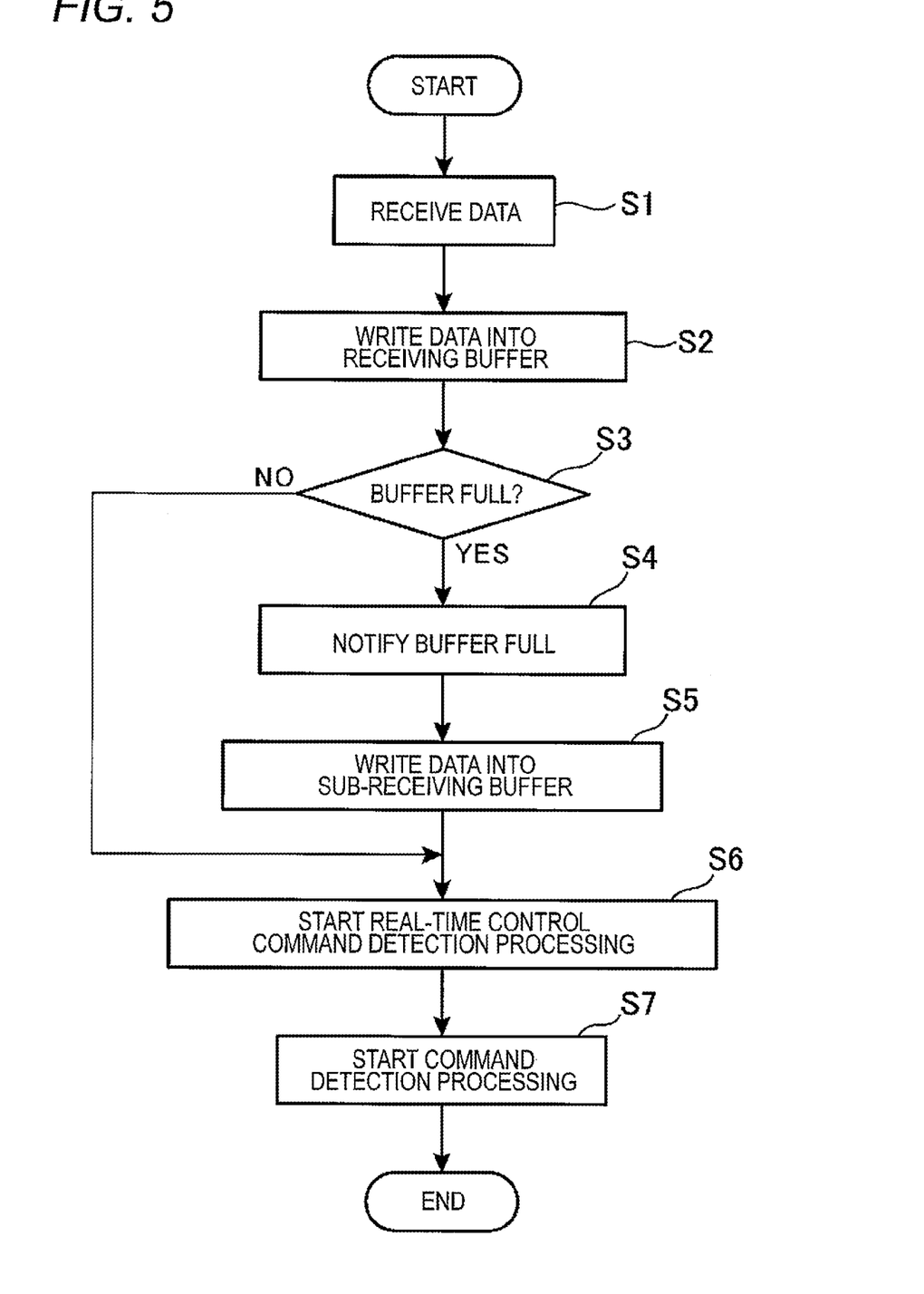
FIG. 5 is a flowchart illustrating the operation of the printer.

FIG. 5 is a flowchart illustrating the operation of the printer 2. FIG. 5 shows the operation of the printer 2 when data is received from the host computer 4.

If data is received by the receiving control section 25 from the host computer 4 through the receiving control section 25 with the function of the receiving control section 25 (Step S1), the printer 2 performs writing into the receiving buffer 31 with the function of the receiving control section 25 (Step S2). The control section 21 determines whether or not the receiving buffer 31 is full (buffer full) (Step S3). When the buffer full state is reached (Step S3: Yes), the buffer full state (offline) is notified to the host computer 4 through the receiving control section 25 (Step S4), and received data which is not written into the receiving buffer 31 and received data received after the buffer full state is notified are written into the sub-receiving buffer 32 (Step S5). In Step S3, it may be determined whether the buffer full state is reached or not on the basis of the value of the counter 31B.

The control section 21 starts real-time control command detection processing with the function of the real-time control command detection section 21B (Step S6), and starts command detection processing with the function of the command detection section 21A (Step S7). Next, this processing ends.

When the receiving buffer 31 is not in the buffer full state (Step S3: No), the process progresses from Step S3 to Step S6, performs the real-time control command detection processing and the command detection processing. Next, this processing ends.

Figure 6:
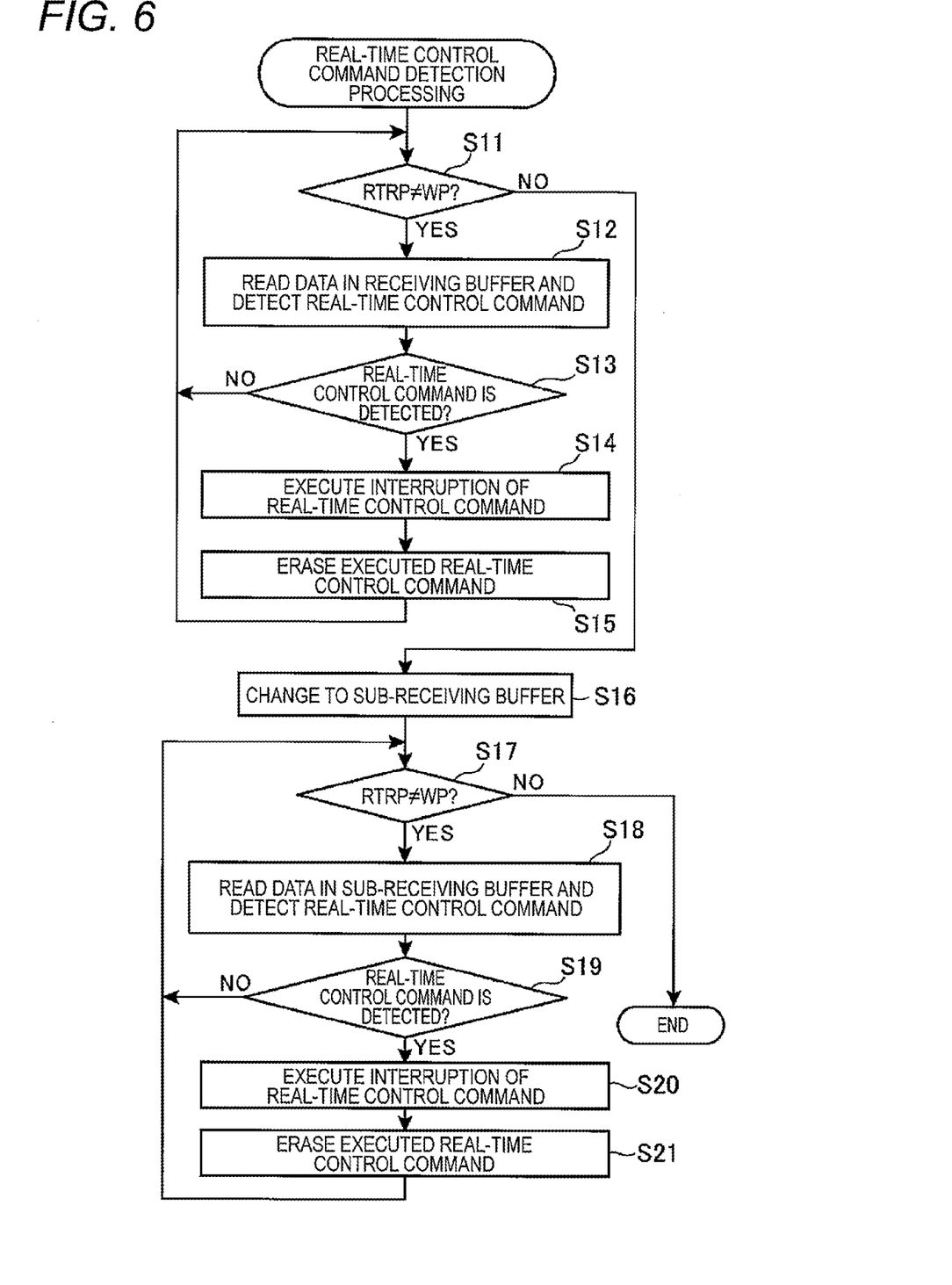
FIG. 6 is a flowchart illustrating the details of the operation of the printer.

FIG. 6 is a flowchart illustrating the details of the real-time control command processing which starts in Step S6 of FIG. 5.

As shown in FIG. 6, in the real-time control command detection processing, the control section 21 first determines whether the position (address) (RTRP) of the real-time control command read pointer 31D in the receiving buffer 31 reaches the position (address) (WP) of the write pointer 31A (Step S11). If the real-time control command read pointer 31D does not reach the position of the write pointer 31A (Step S11: Yes), the control section 21 reads received data D in the receiving buffer 31 with the function of the real-time control command detection section 21B, and detects a real-time control command (Step S12). The control section 21 determines whether or not there is a real-time control command in read received data D (Step S13). When there is no real-time control command (Step S13: No), the process returns to Step S11. When a real-time control command is detected (Step S13: Yes), the detected real-time control command is executed by the command execution section 21C (Step S14). The execution of the real-time control command is made as interruption processing of the control section 21. For this reason, even when there is an operation which is executed by the control section 21 with the function of the command execution section 21C, the operation is stopped and the real-time control command is executed, such that a status notification, an opening operation of the cash drawer 44, clearing of the receiving buffer 31 and the sub-receiving buffer 32, or the like is executed. Thereafter, the control section 21 erases the real-time control command executed by the command execution section 21C (Step S15), and then returns to Step S11.

In the receiving buffer 31, when the position of the real-time control command read pointer 31D reaches the position of the write pointer 31A (Step S11: No), the control section 21 is changed to a detection operation in the sub-receiving buffer 32 (Step S16).

The control section 21 determines whether or not the position (RTRP) of the real-time control command read pointer 32B of the sub-receiving buffer 32 reaches the position (WP) of the write pointer 32A (Step S17). If the real-time control command read pointer 32B does not reach the position of the write pointer 32A (Step S17: Yes), the control section 21 reads received data D in the sub-receiving buffer 32 with the function of the real-time control command detection section 21B and detects the real-time control command (Step S18).

The control section 21 determines whether or not a real-time control command is included in read received data D (Step S19). When there is no real-time control command (Step S19: No), the control section 21 returns to Step S17. When a real-time control command is detected (Step S19: Yes), the control section 21 executes the detected real-time control command with the command execution section 21C (Step S20). The execution of the real-time control command is made as interruption processing. For this reason, even when there is an operation which is executed by the control section 21 with the function of the command execution section 21C, the operation is stopped and the real-time control command is executed, such that a status notification, an opening operation of the cash drawer 44, clearing of the receiving buffer 31 and the sub-receiving buffer 32, or the like is executed. Thereafter, the control section 21 erases the real-time control command executed by the command execution section 21C (Step S21) and then returns to Step S17.

In the sub-receiving buffer 32, when the position of the real-time control command read pointer 31D reaches the position of the write pointer 31A (Step S17: No), this processing ends.

Figure 7:
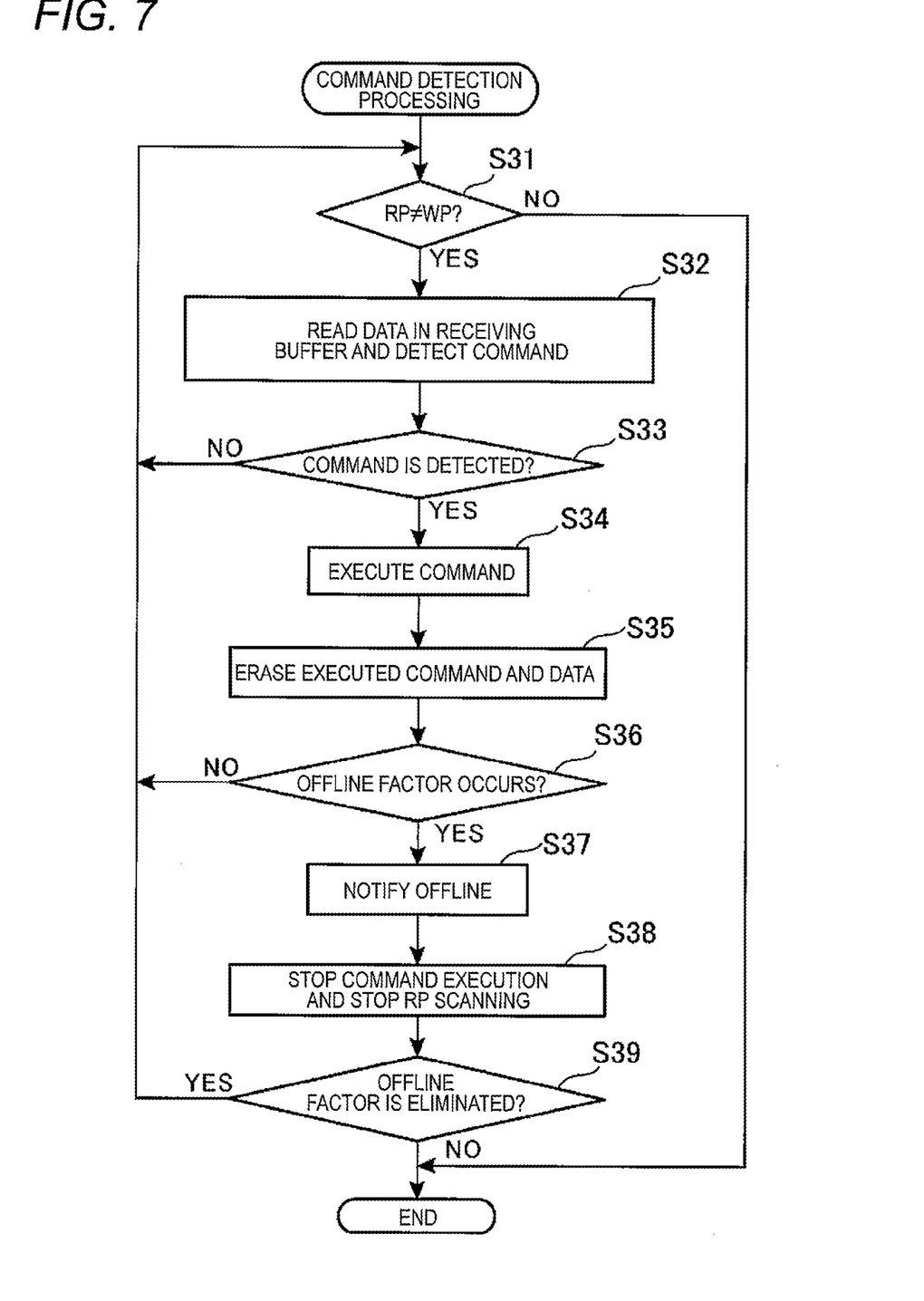
FIG. 7 is a flowchart illustrating the details of the operation of the printer.

FIG. 7 is a flowchart illustrating the details of the command detection processing which starts in Step S7 of FIG. 5.

As shown in FIG. 7, in the command detection processing, the control section 21 first determines whether or not the position (address) (RP) of the read pointer 31C in the receiving buffer 31 reaches the position (address) (WP) of the write pointer 31A (Step S31). If the read pointer 31C does not reach the position of the write pointer 31A (Step S31: Yes), the control section 21 reads received data D in the receiving buffer 31 with the function of the command detection section 21A and detects a command (Step S32). In Step S31, the control section 21 may determine whether or not the position of the read pointer 31C reaches the position of the write pointer 31A on the basis of the value of the counter 31B.

The control section 21 determines whether or not there is a command in read received data D (Step S33). When there is no command (Step S33: No), the control section 21 returns to Step S31. When a command is detected (Step S33: Yes), the control section 21 executes the detected command with the command execution section 21C (Step S34). The detected commands are executed by the command execution section 21C in the stored order in the receiving buffer 31. Thereafter, the control section 21 erases the command executed by the command execution section 21C (Step S35). The control section 21 may perform overwriting next time without erasing the commands.

The control section 21 determines whether an offline factor occurs in the printer 2 or not with the status monitoring section 30 (Step S36). When an offline factor does not occur (Step S36: No), the control section 21 returns to Step S31. When an offline factor occurs (Step S36: Yes), an offline notification is transmitted to the host computer 4 (Step S37), the execution of a command by the command execution section 21C is stopped, reading at the read pointer 31C is stopped (Step S38), and it waits until the offline factor is eliminated (Step S39). When the offline factor is eliminated, the control section 21 returns to Step S31. When the offline factor is not eliminated within a predetermined time (Step S39: No), this processing ends.

In the receiving buffer 31, when the read pointer 31C reaches the position of the write pointer 31A (Step S31: No), this processing ends.

As described above, with the POS terminal 1 according to the embodiment to which the invention is applied, the received data received from the host computer 4 is stored in the receiving buffer 31, and, the receiving buffer 31 is scanned with the read pointer 31C for normal commands and the real-time control command read pointer 31D for real-time control commands individually to respectively detect normal commands and real-time control commands. For this reason, command detection is performed after received data from the host computer 4 is stored in the receiving buffer 31. For this reason, even when a large quantity of data is received front the host computer 4 in a short time, all pieces of data can be reliably received and analysis can be performed without leakage to detect the commands. The real-time control command is detected by scanning the receiving buffer with a read pointer different from that for the normal commands, the real-time control command can be rapidly detected with no effect of the execution state of the normal command. Thus, even when there is a large quantity of received data, it is possible to rapidly respond to the real-time control command.

In the offline state where the execution of a normal command is stopped, a real-time control command may be executed. In this case, it is advantageous in that it is possible to rapidly respond to the real-time control command even in the offline state.

The printer 2 includes the sub-receiving buffer 32 which stores received data received after the receiving buffer 31 has been full. The real-time control command detection section 21B scans the sub-receiving buffer 32 with the real-time control command read pointer 32B to detect the real-time control command. For this reason, even when there is a large quantity of received data and the receiving buffer 31 is full, a real-time control command can be detected from received data received after the receiving buffer 31 is full and executed. Thus, even when a large quantity of received data is received, it is possible to rapidly respond to the real-time control command. When the receiving buffer 31 is full, usually, the offline state is reached where command detection or execution is not performed. With the configuration according to the embodiment of the invention, a real-time control command can be detected and executed separately from a normal command. Therefore, it is possible to rapidly respond to the real-time control command with no effect of the execution state of the normal command.

The receiving control section 25 directly stores received data in the receiving buffer 31 before commands are detected by the command detection section 21A and the real-time control command detection section 21B. Therefore, even when a large quantity of data is received from the host computer 4 in a short time, all pieces of data can be reliably received, and analysis can be performed without leakage to detect the commands.

The receiving buffer 31 is scanned such that the real-time control command read pointer 31D is ahead of the read pointer 31C. Therefore, it is possible to rapidly detect the real-time control command with no effect of the detection and execution states of the normal command.

The counter 31B is provided to count the read position of the read pointer 31C. The counter 31B is not counted up through scanning by the real-time control command read pointer 31D. Therefore, it is possible to rapidly detect the real-time control command with no effect of the detection and execution states of the normal command so as not to affect the detection operation of the normal command.

Figure 8A:
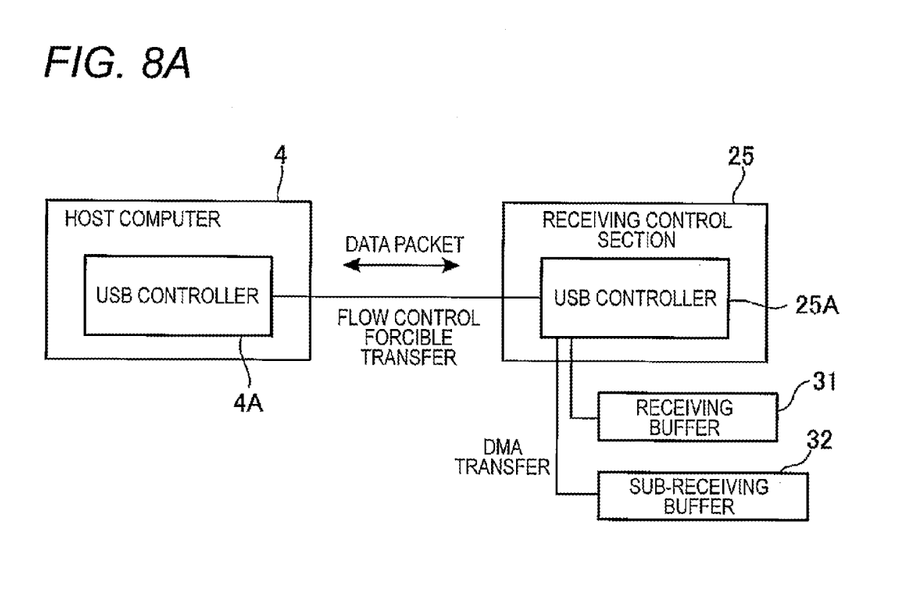
FIG. 8A is an explanatory view illustrating an example of a connection mode between the host computer and the printer.
Figure 8B:
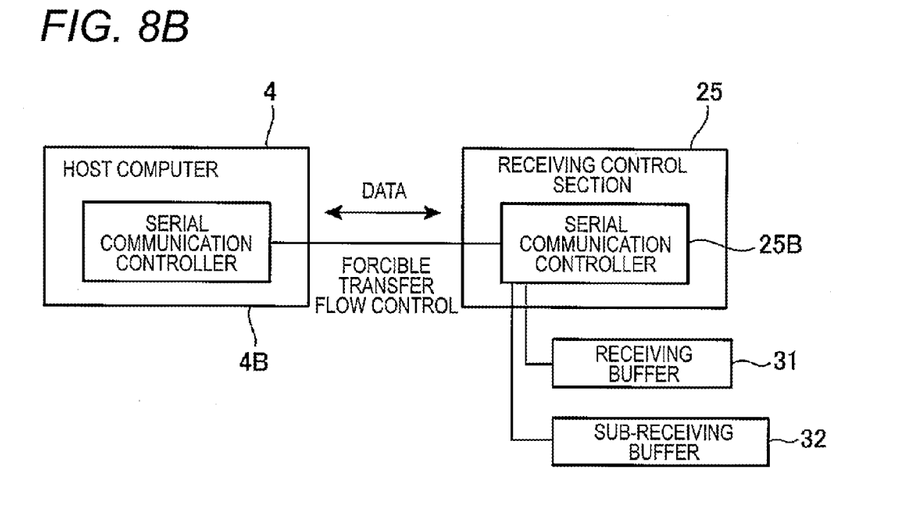
FIG. 8B is an explanatory view illustrating an example of a connection mode between the host computer and the printer.

Specific examples of a connection mode between the host computer 4 and the printer 2 will be described with reference to FIGS. 8A and 8B. FIG. 8A shows a mode where the host computer 4 and the printer 2 are connected to each other by a USB communication interface. FIG. 8B shows a mode where the host computer 4 and the printer 2 are connected to each other by an RS232C serial communication interface.

In the example of FIG. 8A, the host computer 4 includes a USB controller 4A, and the receiving control section 25 includes a USB controller 25A. A USB connection is established between the USB controller 4A and the USB controller 25A, and data is transmitted. The USB controller 4A functions as a master device, and the USB controller 25A functions as a slave device.

Data is transmitted and received between the USB controller 4A and the USB controller 25A in the form of packets having a preset size. Each time one or several packets transmitted from the USB controller 4A are received by the USB controller 25A, the USB controllers 4A and 25A can perform control to transmit a response of reception confirmation from the USB controller 25A and also perform a forcible transmission operation to transmit several collected data packets from the USB controller 4A with respect to no response of the USB controller 25A.

The USB controller 25A (transfer section) has a DMA transfer function of storing received data received from the USB controller 4A in the receiving buffer 31 or the sub-receiving buffer 32 without control of the control section 21. The DMA transfer function enables data to be transmitted and received between the USB controller 25A and the receiving buffer 31 or the sub-receiving buffer 32 at a high speed, improving throughput. In addition, received data can be stored in the receiving buffer 31 and analyzed without leakage. With this configuration, as described above, the real-time control command read pointer 31D is provided in the receiving buffer 31 separately from the read pointer 31C, the receiving buffer 31 is scanned with this real-time control command read pointer 31D to detect a real-time control command, and the detected real-time control command is interrupted and executed by the commend execution section 21C. Therefore, it is possible to rapidly and reliably respond to the real-time control command.

Even when the receiving buffer 31 is full, received data is stored in the sub-receiving buffer 32. Therefore, even when a large quantity of data is collectively transmitted with the forcible transmission function, the real-time control command can be received and executed without leakage.

In the example of FIG. 8B, the host computer 4 includes a serial communication controller 4B, and the receiving control section 25 includes a serial communication controller 25B. Data is transmitted and received between the serial communication controllers 4B and 25B through a serial communication cable. Various communication protocols can be executed between the serial communication controllers 4B and 25B. For example, a procedure may be provided such that, after data is transmitted from the serial communication controller 4B, it is confirmed that the serial communication controller 25B transmits data reception confirmation, and then next data is transmitted from the serial communication controller 4B. Alternatively, nonprocedural communication may be performed without flow control. In addition, a forcible transmission operation can be performed to transmit collected data from the serial communication controller 4B without confirming the response of the serial communication controller 25B.

The serial communication controller 25B stores received data received from the serial communication controller 4B in the receiving buffer 31 without control of the control section 21. With this function, when forcible transmission is performed between the serial communication controllers 4B and 25B, overhead due to transmission and reception of the response can be reduced, transmitting and receiving data at a high speed and improving throughput. In addition, received data can be stored in the receiving buffer 31 and analyzed without leakage. With this configuration, as described above, the real-time control command read pointer 31D is provided in the receiving buffer 31 separately from the read pointer 31C, the receiving buffer 31 is scanned with this real-time control command read pointer 31D to detect a real-time control command, and the detected real-time control command is interrupted and executed by the commend execution section 21C. Thus, it is possible to rapidly and reliably respond to the real-time control command. In addition, when the receiving buffer 31 is full, received data is stored in the sub-receiving buffer 32. Therefore, even when a large quantity of data is collectively transmitted with the forcible transmission function, the real-time control command can be received and executed without leakage.

As shown in FIG. 8A, when data is transmitted and received through the USB interface, since the USB controller 25A has a function of holding part of received data received from the USB controller 4A, partial data is held when a large quantity of data is collectively transmitted with the forcible transmission function, and after the capacity of the receiving buffer 31 is recovered, received data held by the USB controller 25A is written into the receiving buffer 31. Meanwhile, the serial communication controller 25B does not have such a function. With the configuration of this embodiment, the sub-receiving buffer 32 is provided in addition to the receiving buffer 31. Therefore, even when the receiving control section 25 itself has or does not have a function of holding received data, received data can be stored without leakage, and the real-time control command can be detected and executed.

The above-described embodiment shows a specific example to which the invention is applied, but the invention is not limited thereto. For example, although in the above-described embodiment, an example has been described where the receiving buffer 31 and the sub-receiving buffer 32 are separately provided in the printer 2, the invention is not limited thereto. The receiving buffer 31 and the sub-receiving buffer 32 may be storage areas which are virtually separated from each other on a single storage device. Each functional section shown in FIGS. 2 and 3 can be arbitrarily implemented by cooperation between hardware and software, but does not suggest a specific hardware configuration. Although in the above-described embodiment, a case has been described where, in the POS terminal 1, the invention is applied to the printer 2 which prints the receipt 101, the invention is not limited thereto. A configuration may be made such that the host computer 4 is connected to a printer, which independently functions, through various communication means. For example, the printer 2 may be connected to a plurality of host computers 4 through a LAN. For example, the communication protocols or communication standards which are executed by the host computer 4 and the receiving control section 25 are not particularly limited, and arbitrary communication protocols or communication standards may be used. Although in the above-described embodiment, an example has been described where the printer 2 itself includes the control section 21, the receiving control section 25, the receiving buffer 31, and the sub-receiving buffer 32, for example, a control device including the control section 21, the receiving control section 25, the receiving buffer 31, and the sub-receiving buffer 32 may be separately provided so as to be externally connected to the printer 2.

A recording device to which the invention can be applied is not particularly limited insofar as a printer can operate in accordance with commands. The invention may be applied to an ink jet type printer, a dot impact type printer, a laser printer, or a thermal sublimation type printer. The invention may also be applied to a printer which forms letters or images in other schemes, or a printer which is incorporated into another apparatus. The invention may also be applied to a printer which performs recording on an electronic medium.

A program to which the invention can be applied may be included in a printer driver which is mounted in the host computer 4.

In the above-described embodiment, the control program 24A which is executed by the control section 21 is stored in the EEPROM 24. However, a recording medium which stores the control program is not limited thereto. For example, the control program may be stored in a semiconductor memory, an optical readable and writable disk, a magnetic readable and writable disk, or the like. A program recorded in the recording medium is stored in the EEPROM 24 through a drive device which performs reading and writing and executed by the control section 21.

What is claimed is:

1. A printer which is configured to be connected to a host computer external to the printer and performs recording based on received data including commands, the printer comprising:

a receiving control section that receives signals transmitted from the host computer and decodes the signals to create the received data;

a receiving buffer that stores therein the received data created by the receiving control section;

a command detection section that reads the received data stored in the receiving buffer while scanning the receiving buffer with a first read pointer to detect the commands included in the received data;

a command execution section that processes the commands detected by the command detection section in a stored order of the commands in the receiving buffer;

an immediate processing command detection section that reads the received data stored in the receiving buffer while scanning the receiving buffer with a second read pointer which is provided separately from the first read pointer to detect an immediate processing command included in the received data; and a control section that includes the command detection section, the command execution section and the immediate processing command detection section, wherein the command execution section preferentially processes the immediate processing command detected by the immediate processing command detection section regardless of the stored order of the commands in the receiving buffer, wherein the control section notifies an operation state thereof when the operation state is changed from an online state to an offline state, the online state in which a communication with the host computer and the recording can be performed, the offline state in which the printer is logically disconnected to the host computer, and wherein even when the control section is in the offline state, the immediate processing command can be processed by the command execution section.

2. The printer according to claim 1, further comprising an immediate processing command buffer that stores therein received data received from the host computer after the receiving buffer become substantially full with the received data, wherein the immediate processing command detection section scans the immediate processing command buffer with the second read pointer to detect the immediate processing command included in the received data.

3. The printer according to claim 1, wherein the receiving buffer is scanned such that the second read pointer is ahead of the first read pointer.

4. The printer according to claim 1, even when the immediate processing command which has been detected by the second read pointer is again detected by the first read pointer, the command execution section does not process the immediate processing command redundantly.

5. The printer according to claim 1, further comprising a receiving control section that stores the received data received from the host computer in the receiving buffer before the command detection section and the immediate processing command detection section respectively detect the commands included in the received data.

6. The printer according to claim 5, wherein the receiving control section includes a transfer section that directly transfers the received data received from an interface of the host computer to the receiving buffer.

7. The printer according to claim 1, wherein the receiving control section includes a connector to which a communication cable is connected and a communication circuit.

8. The printer according to claim 1, wherein the receiving control section includes a wireless communication circuit and antenna.

9. A method of controlling a printer which is configured to be connected to a host computer external to the printer and performs recording based on received data including commands, the method comprising:
   receiving signals transmitted from the host computer;
   decoding the signals to create the received data;
   storing the received data received from the host computer in a receiving buffer;
   reading the received data stored in the receiving buffer while scanning the receiving buffer with a first read pointer to detect the commands included in the received data;
   processing the detected commands in a stored order of the commands in the receiving buffer;
   reading the received data stored in the receiving buffer while scanning the receiving buffer with a second read pointer which is provided separately from the first read pointer to detect an immediate processing command included in the received data;
   preferentially processing the detected immediate processing command regardless of the stored order in the receiving buffer; and
   notifying an operation state of a controller provided in the printer when the operation state is changed from an online state to an offline state, the online state in which a communication with the host computer and the recording can be performed, the offline state in which the printer is logically disconnected to the host computer,
   wherein even when the control section is in the offline state, the immediate processing command can be processed in the processing of the detected immediate processing command.

10. The method according to claim 9, further comprising:
   storing received data received from the host computer in an immediate processing command buffer after the receiving buffer become substantially full with the received data; and
   scanning the immediate processing command buffer with the second read pointer to detect the immediate processing command included in the received data.

11. The method according to claim 9, wherein the receiving buffer is scanned such that the second read pointer is ahead of the first read pointer.

12. The method according to claim 9, even when the immediate processing command which has been detected by the second read pointer is again detected by the first read pointer, the immediate processing command is not processed redundantly.

13. The method according to claim 9, wherein the received data received from the host computer is stored in the receiving buffer before the commands included in the received data are detected.

14. The method according to claim 13, wherein the received data received from an interface of the host computer is directly transferred to the receiving buffer.

15. A non-transitory computer-readable recording medium that records therein a program that causes a controller of a printer, which is configured to be connected to a host computer external to the printer and performs recording based on received data including commands received from the host computer, to execute the method of according to claim 9.

16. The method according to claim 9, wherein the receiving and the decoding are performed by a connector to which a communication cable and a communication circuit which are provided in the printer.

17. The method according to claim 9, wherein the receiving and the decoding are performed by a wireless communication circuit and an antenna which are provided in the printer.

* * * * *